United States Patent Office 3,413,407
Patented Nov. 26, 1968

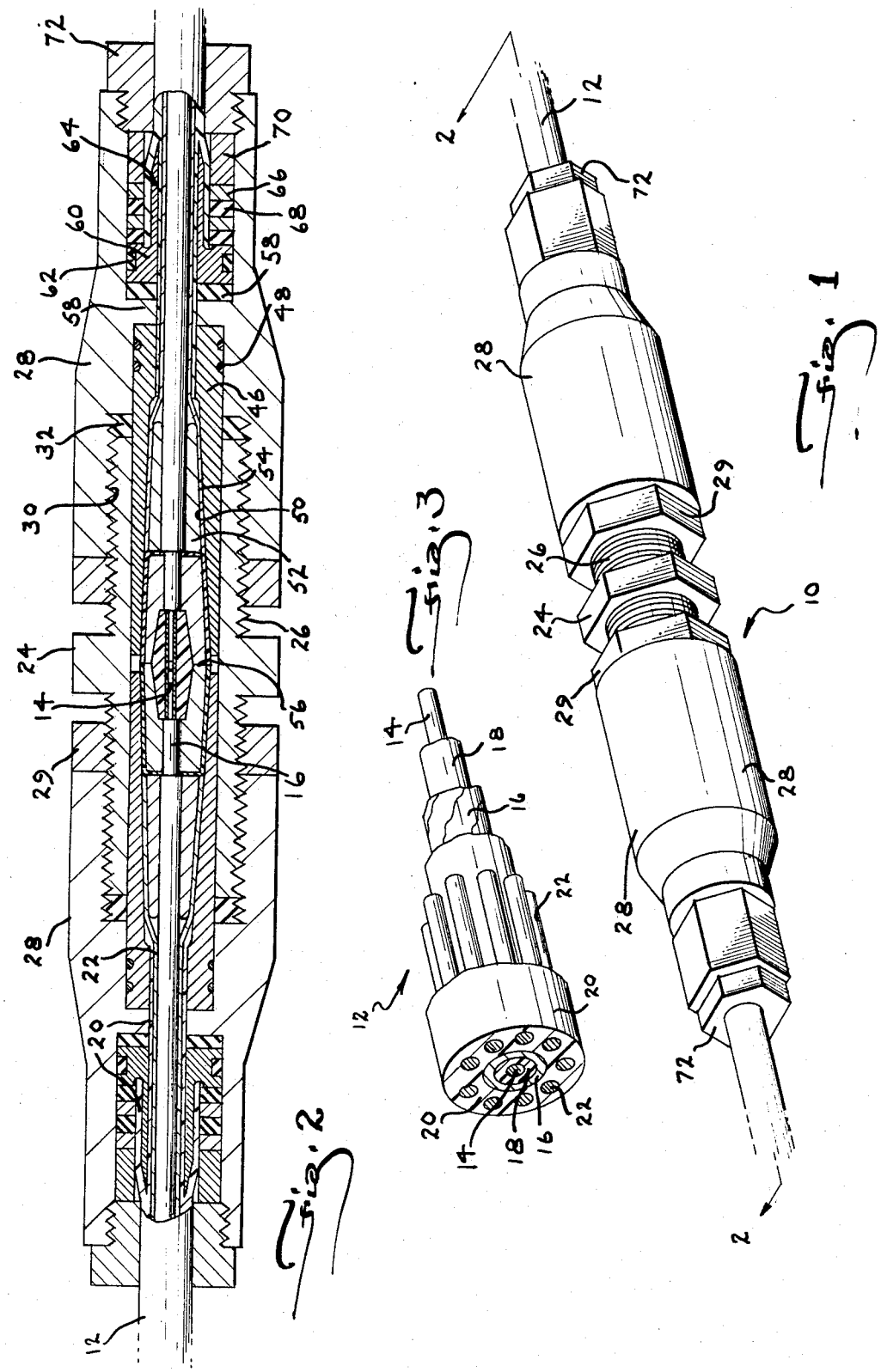

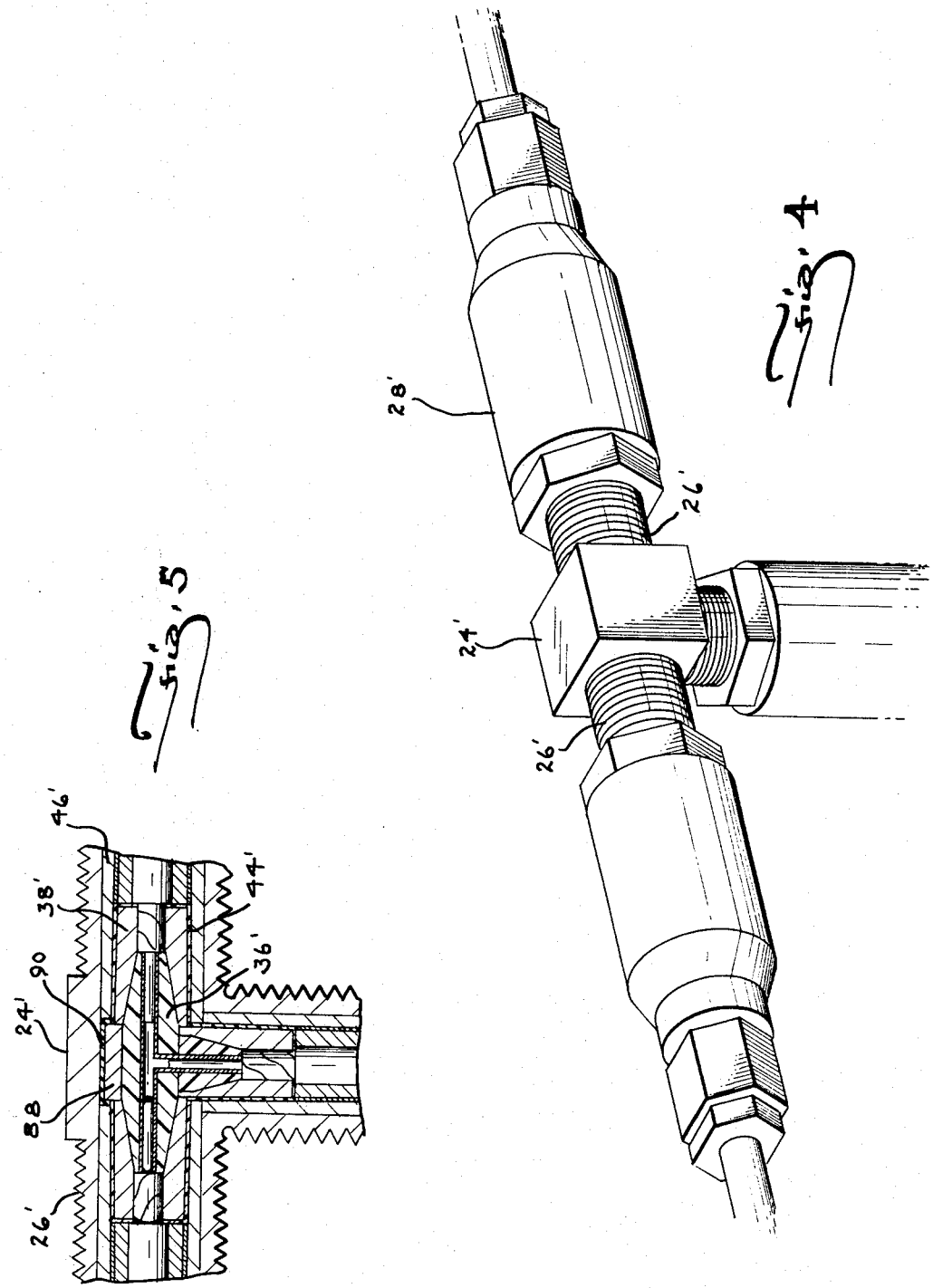

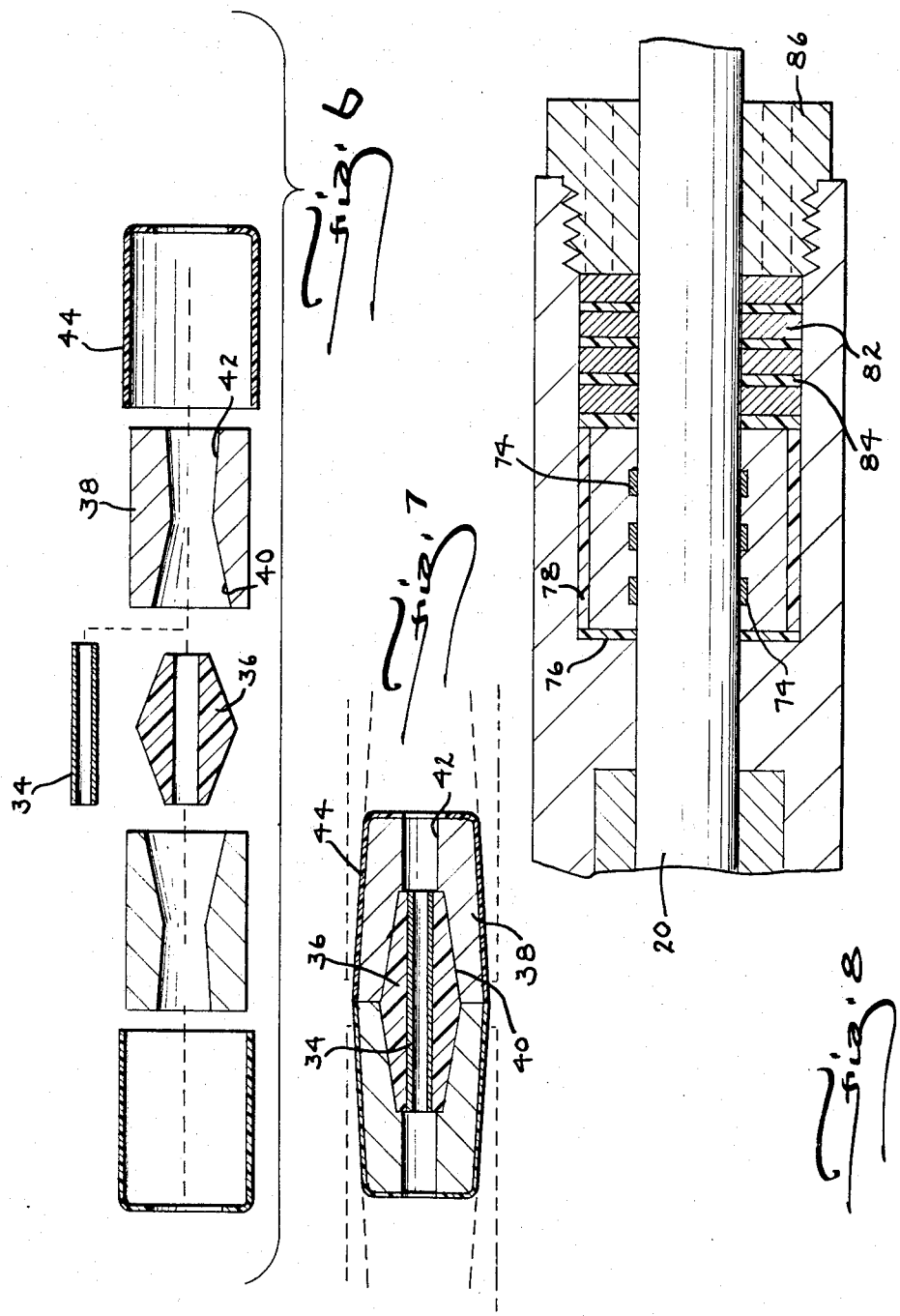

3,413,407
CONNECTOR FOR UNDERWATER CABLE
Rossiter Raymond Potter, Harrisburg, Pa., assignor to
AMP Incorporated, Harrisburg, Pa.,
Filed Dec. 30, 1965, Ser. No. 517,553
10 Claims. (Cl. 174—89)

ABSTRACT OF THE DISCLOSURE

A waterproof splice is provided for use with underwater cables. Two cables may be joined end-to-end, or three cables may be joined in T-shaped relation. The splices are adapted to cables having tensile wires, an inner conductor, and an outer braid. An effective seal is provided between the splice and the outer insulating cover of the cables and the splices are easily applied by simple tooling. The internal surfaces of the splices are provided with cooperating tapering surfaces which interact upon relative axial movement between various parts of the splice. Alternative forms of sealing means are provided for accommodating various cable configurations and outer cover materials.

---

Underwater cables are used for a variety of purposes, one of which is in a cable grid detection system. In such instance the cables normally lie on the ocean floor and remain there for an indefinite length of time. It is necessary to splice lengths of cable together in order to get a grid system of sufficient size and these splices must be waterproof and must resist corrosion due to the extended period of time during which they remain under water. The particular cables presently used for detection systems are difficult to splice because of their size and construction and it has therefore been a problem in the industry to develop a satisfactory splice.

It is therefore an object of this invention to provide a splice suitable for use on underwater cables.

Another object of the invention is to provide a splice which is capable of rapid and easy installation on conventional underwater cables.

A further object of the invention is to provide for the splicing of three cables to a common point.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purpose of illustration in order that others skilled in the art may fully understand the invention and the principles thereof and the manner of applying it in practical use so that they may modify it in various forms, each as may be best suited to the conditions of a particular use.

In the drawings, in which like reference numerals refer to like parts:

FIGURE 1 is a perspective view of an underwater cable splice made in conformance with the teachings of the present invention;

FIGURE 2 is a longitudinal cross-section taken along the line 2—2 of FIGURE 1;

FIGURE 3 is a fragmentary perspective view showing the details of construction of a commonly used underwater cable;

FIGURE 4 is a perspective view of an alternative form of the present invention wherein three cables are joined in T-shaped relationship;

FIGURE 5 is a cross-sectional view of the junction area of the cable splice shown in FIGURE 4;

FIGURE 6 is an exploded cross-sectional view of a portion of the parts shown in FIGURE 2;

FIGURE 7 is a cross-sectional view showing the parts of FIGURE 6 in their assembled form; and FIGURE 8 is a cross-sectional view showing an alternative form of a seal.

A cable splice indicated generally at 10 in FIGURE 1 joins two cables 12 in end-to-end relationship. The cables 12, as shown in FIGURE 3, consist of an inner conductor 14 and a metal braid or outer conductor 16. The inner and outer conductors are separated by an insulating layer 18. Surrounding the braid 16 is the tough insulating cover 20 and imbedded within cover 20 are a series of steel tensile wires 22 for adding strength to the cables.

The splice 10 comprises a center hollow shell 24 preferably made of stainless steel to resist corrosion. The shell 24 has a central section adapted to be engaged by a wrench or the like for assembly purposes and is externally threaded as indicated at 26 over a substantial portion of its length. All of the portions of the cable splice which are exposed to the salt water of the sea are preferably made of stainless steel for resisting corrosion during extended periods of time.

A pair of hollow outer sleeves 28 are provided with internal threads 30 for mating with the threads 26 of the center shell 24 and are retained in position by lock nuts 29. The outer ends of the sleeves 28 are suitably configured for engagement by an assembly tool such as a wrench or the like. A sealing ring 32 is disposed at each of the threaded ends of center shell 24 and is squeezed tightly between the ends of shell 24 and the bottom of the internally threaded portion of the outer sleeves 28 to thus provide a partial watertight seal.

Electrical continuity between the inner conductors 14 of the cables 12 is achieved by means of a hollow inner connector 34 suitably made of copper. With reference to FIGURES 6 and 7 the inner connector 34 is held within the hollow interior of a bushing 36 formed of an electrically insulating material. A pair of outer connectors 38, also preferably formed of copper, engage opposite end portions of the bushing 36. The connectors 38 have a pair of internally tapered surfaces 40 and 42. Upon assembly of the cable splice 10 the connectors 38 will be forced toward each other into the position shown in FIGURE 7. An inspection of FIGURES 6 and 7 shows that the movement of connectors 38 toward each other causes the insulating bushing 36 to be compressed radially and elongated axially. This deformation of the bushing 36 causes the bushing to tightly engage the inner connector 34 and consequently causes the connector 34 to be in intimate contact with the inner conductors 14 of the cables to thereby insure a good electrical connection. A pair of electrically insulating cups 44 are disposed around the outer connectors 38 to insulate the current carrying portions of the cable splice from the external portions of the splice.

The tapered portions 42 of the outer connectors 38 overlie the metal braid or outer conductor 16 of the cables 12. The tapers 42 are caused to assume a cylindrical configuration as shown in FIGURE 7 to tightly engage the metal braid by means to be described.

Turning again to FIGURE 2 a pair of sockets 46 having a generally cylindrical outer surface are disposed within suitable openings formed in the outer sleeves 28. Sealing means 48, which may comprise O-rings, are disposed about one end of the sockets 46 and provide a seal between the sockets and the outer sleeves 28. The sockets 46 are hollow and are provided with an internal taper 50 extending over a substantial portion of its inner surface. Disposed within the sockets 46 are hollow plugs 52 having a tapered outer surface as indicated at 54.

Extending between the tapered surface 54 of the plug 52 and the tapered surface 50 of the sockets 46 are the tensile wires 22 of the cables. The taper 54 is slightly less than the taper 50 to permit the plug 52 to be forced deeply into the socket 46. During assembly of the splice 10 the plugs 52 will be forced into the sockets 46 until the tensile wires 22 are firmly grasped between the tapered surfaces of the plugs and the sockets. Due to the slight difference in the tapers the highest gripping force on the tensile wires is achieved near the smaller end of the plugs 52.

The inner and outer connector assembly shown in FIGURE 7 is placed between the two sockets 46 and the sockets are forced toward each other until the insulating cups 44 seat against the ends of the plugs 52. The internal taper of the sockets 46 causes the insulating cups 44 to be deformed from their cylindrical configuration shown in FIGURE 6 to their truncated conical configuration shown in FIGURE 7. This deformation of the cups 44 causes the outer connectors 38 to also be deformed into a conical configuration causing the tapered surfaces 42 of the outer connectors to be flattened and to be pressed into firm engagement with the metal braid 16 of the cables. This insures good electrical connection between the outer connectors and the metal braid and the electrical continuity between the two cables is achieved by reason of the outer connectors 38 having been firmly pressed into contact with each other as indicated at 56.

Having thus established electrical continuity between the cables it is now necessary to provide for an adequate seal between the cables and the splice. The distal ends of the outer sleeves 28 are provided with a cylindrical bore within which is housed the sealing means. With reference to FIGURE 2 the sealing means comprises an insulating washer 58 lying against an abutment surface 58 formed along the inner surface of the outer sleeve 28. A metallic nipple 60 is encircled by an O-ring 62 and has an elongated knife-like portion 64 of circular configuration for biting into the outer insulation of the cables 12. A series of metallic washers 66 and nonmetallic washers 68 are alternately placed around the nipple 60 and the insulating cover of the cable and a spacing washer 70 is employed when needed. A gland nut 72 is threaded into the end of the outer sleeves 28 to maintain the sealing assembly in position and to apply sufficient force to cause the nonmetallic sealing rings and washers to expand radially to provide a fluid-tight seal.

Although the sealing means shown in FIGURE 2 is quite effective on most of the underwater cable currently in use there are some cables which, while of the same basic configuration, have an outer cover making it impossible to use the knife-like portion 64 of the nipple 60 to enter the cover. For this reason an alternative form of seal has been provided and is illustrated in FIGURE 8. A plurality of rings 74 of copper or the like are secured to the outer cover 20 of the cable. An insulating washer 76 and insulating cylinder 78 are inserted within a cylindrical recess formed in the distal portion of the outer shell. A mass of molded metal 80 is inserted into the cavity defined by the washer 76 and cylinder 78 and is locked in position on the cable by the flow of the metal 80 around the rings 74, the cylinder 78 permitting the seal assembly to rotate within sleeve 28. A series of metallic washers 82 and nonmetallic washers 84 are placed around the cable and are secured in position by a gland nut 86 in a manner similar to that previously described in connection with the seal of FIGURE 2.

Turning now to FIGURES 4 and 5 there is shown a modification of the splice previously described whereby three cables may be joined at a single point. Those parts performing the same function as corresponding parts previously described have been indicated by primed reference numerals. The center shell 24' is provided with three threaded end sections 26' which are hollow and receive the sockets 46'. The inner connector 34' is of hollow T-configuration for accepting the inner conductors 14 of the three cables 12. The metal braid 16 of the three cables is electrically connected by means of the three outer connectors 38' and a center connector 88 which is firmly contacted by each of the outer connectors 38' thus establishing electrical continuity. An insulating member 90 is disposed between the center connector 88 and the center shell 24' for insulating the electrically conductive paths from the center shell. An insulating bushing 36' is formed in T-configuration or optionally may be formed as two separate parts and is compressed onto the inner connector 34' in the same manner as the inner connector 34 previously described. The various parts are all assembled and co-act in a similar manner as the end-to-end splice shown in FIGURE 2.

Thus it can be seen that the objects of the invention have been achieved in that an underwater splice has been provided for connecting two or three cables and an effective sealing means has been provided for use with either of two different types of conventional underwater cable.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. A device joining two cables in end-to-end relationship, each said cable comprising an inner conductor, inner insulation surrounding said inner conductor, conductive braid around said inner insulation, outer insulation surrounding said braid, and tensile wires within said outer insulation, said device comprising a center hollow shell, said shell being externally threaded at opposite ends, a pair of outer sleeves threadably engaging the ends of said center shell, said sleeves being hollow to permit the longitudinal passage of the cables therethrough, a pair of sockets located within said center shell, sealing means surrounding the outer ends of said sockets and engaging the inner surface of said outer sleeves, additional sealing means surrounding said sockets and located at the outer ends of said center shell, said sockets being hollow and having a portion thereof in engagement with the insulation on said cables, said sockets further having an internal taper extending over a substantial portion of the internal surface of said sockets, a hollow plug having a tapered external surface inserted within each of said sockets, the taper on said plugs being slightly less than the taper on the inner surface of said sockets whereby the tensile wires on said cables are securely grasped between the tapered surfaces of said plugs and said sockets, insulating means disposed within the said sockets, a pair of outer connectors within said insulating means, said outer connector having oppositely directed tapered internal surfaces, one of said surfaces being pressed onto the braid of each of said cables, the outer connectors being abutted at their inner ends whereby there is electrical continuity between the outer braids of each of said cables, an insulating bushing disposed within said outer connectors and having tapered surfaces mating with the tapered surfaces of said outer connectors, said bushing having an aperture extending axially therethrough receiving an inner connector, said inner connector being pressed into engagement with the inner conductors of each of said cables, and means sealing the outer insulation of said cables to the distal ends of said outer sleeves.

2. A device joining two cables in end-to-end relationship as set forth in claim 1 wherein each said last named sealing means comprises a nipple surrounding said cable and having a thin, elongated portion for penetrating the outer insulation on said cable, a plurality of sealing rings surrounding said nipple, the inner most of said rings contacting an abutment surface on said outer sleeve, and threaded means engaging the internal surface of the end of said outer sleeve maintaining said sealing means in contact with said abutment.

3. A device joining two cables in end-to-end relationship, as set forth in claim 1 wherein each said last named sealing means comprises a plurality of washers surrounding said cable, said washers being alternately metallic and nonmetallic, and a plurality of metallic rings secured to said cable anchoring a mass of molded metal disposed between said cable and the inner surface of said outer sleeve.

4. A device joining three cables in T-shaped relationship, each said cable comprising a center conductor, inner insulation surrounding said center conductor, conductive braid around said inner insulation, outer insulation surrounding said braid, and tensile wires within said outer insulation, said device comprising a center T-shaped shell, said shell having a center portion and being externally threaded at each end, said threads extending over a substantial portion of said shell, a socket disposed within each end of said shell, said sockets having a cylindrical outer surface and a tapered bore, a tapered plug disposed in each said socket to firmly grasp the tensile wires of said cables between said plug and said socket, the taper of said plug being slightly less than the taper of said socket, said plugs being hollow and surrounding the inner insulation on said cables, an insulating cup disposed within said sockets and at the inner end of each of said tapered plugs, an outer connecter within each of said insulating cups, said outer connectors being pressed into firm engagement with the braid on each of said cables, an insulating bushing having portions extending into the end of each of said outer connectors, a center connector surrounding said insulating bushing and being in contact with each of said oufer connectors whereby electrical continuity is maintained between each of said cables through said braid and said connectors, an inner connector within said bushing and pressed into contact with the center conductor of each of said cables, an outer sleeve threadably engaging each end of said center shell, and sealing means disposed within said outer sleeves and surrounding the outer insulation on said cables.

5. A device joining three cables in T-shaped relationship as set forth in claim 4 wherein each said sealing means comprises a nipple surrounding said cable and having a thin, elongated portion penetrating the outer insulation on said cable, a plurality of sealing rings surrounding said nipple, the inner most of said rings contacting an abutment surface on said outer sleeve, and threaded means engaging the internal surface of the end of said outer sleeve for maintaining said sealing means in contact with said abutment.

6. A device joining three cables in T-shaped relationship as set forth in claim 4 wherein each said sealing means comprises a plurality of washers surrounding said cable, said washers being alternately metallic and nonmetallic, and a plurality of metallic rings secured to said cable for anchoring a mass of molded metal disposed between said cable and the inner surface of said outer sleeve.

7. A device joining two cables in end-to-end relationship, each said cable comprising a center conductor, inner insulation surrounding said inner conductor, conductive braid around said inner insulation, outer insulation surrounding said braid, and tensile wires within said outer insulation, said device comprising a center hollow shell, said shell having a central portion and being externally threaded at opposite ends, said threads extending over a substantial portion of said shell, a pair of sockets disposed within said shell, said sockets having a cylindrical outer surface and a tapered bore, a tapered plug disposed in each said socket to firmly grasp the tensile wires of said cables between said plug and said socket, the taper of said plug being slightly less than the taper of said socket, said plugs being hollow and surrounding the inner insulation on said cables, a pair of insulating cups disposed within said sockets and between said plugs, a pair of outer connectors within said cups and being in engagement with each other, said connectors being pressed into contact with the braid of said cables whereby there is electrical continuity between the two cables, an insulating bushing disposed within said connectors, an inner connector within said bushing and pressed into contact with the center conductor of each said cable, a pair of outer sleeves internally threaded at a first end and threadably engaging each end of said center shell, and sealing means within a second end of said sleeve and surrounding the outer insulation on said cables.

8. A device splicing the ends of cables, each said cable having an inner conductor and an outer conductive braid, said device comprising an inner connector receiving axially therein the inner conductors of said cables, said inner connector being pressed into engagement with said conductors for establishing electrical continuity between said cables, an insulating member surrounding said inner connector, and an outer connector surrounding said insulating member, said outer connector being pressed into engagement with the braid on said cables for establishing further electrical continuity between said cables, said outer connector comprising a pair of mating halves, each half having an inner surface defining oppositely directed tapers, one said taper mating with a correspondingly tapered surface on said insulating member, the other said taper permitting deformation of said outer connector during pressing onto said cable braid.

9. A seal preventing the ingress of moisture between a cable and a hollow connector comprising; an insulating cup disposed within said connector and surrounding said cable, a plurality of rings mechanically secured to said cable and in axial alignment with said insulating cup, abutment means on said connector locating said insulating cup relative to said connector, a mass of molded metal formed between said cable and said insulating cup and anchored to said cable by said rings, a plurality of metallic and nonmetallic washers disposed between said cable and said connector, said washers being in juxtaposition to said molded metal, said washers and said abutment means being disposed on opposite ends of said insulating cup, and means threadably engaging an end of said connector maintaining said washers in position within said connector.

10. A device joining two cables in end-to-end relationship, each said cable having a center conductor, a conductive braid surrounding said center conductor and electrically separated therefrom, outer insulation surrounding said braid, and tensile wires disposed within said outer insulation, said device comprising a center hollow shell, a pair of sockets disposed within said shell and having a tapered bore, a tapered plug disposed in each said socket firmly grasping the tensile wires of said cables between said plug and said socket, said plugs being hollow and surrounding said cables, a pair of insulating cups disposed within said sockets and between said plugs, an outer connector within said cups, said connector being pressed into contact with the braid of said cables whereby there is electrical continuity between the two cables, an insulating bushing disposed within said connector, an inner connector within said bushing and pressed into contact with the center conductor of each said cable, a pair of outer sleeves engaging each end of said center shell, and sealing means within said sleeves and surrounding the outer insulation on said cables.

References Cited

UNITED STATES PATENTS

| 2,177,509 | 10/1939 | Abbott. | |
| 2,546,309 | 3/1951 | Kempf. | |
| 3,072,415 | 1/1963 | Lombard et al. | 174—77 XR |
| 3,113,999 | 12/1963 | Heikkinen | 174—89 XR |
| 3,226,470 | 12/1965 | Bryant | 174—89 XR |

DARRELL L. CLAY, *Primary Examiner.*